July 2, 1935.  H. E. DENDOFF  2,006,886
PARKING DEVICE
Filed Dec. 28, 1933   2 Sheets-Sheet 1
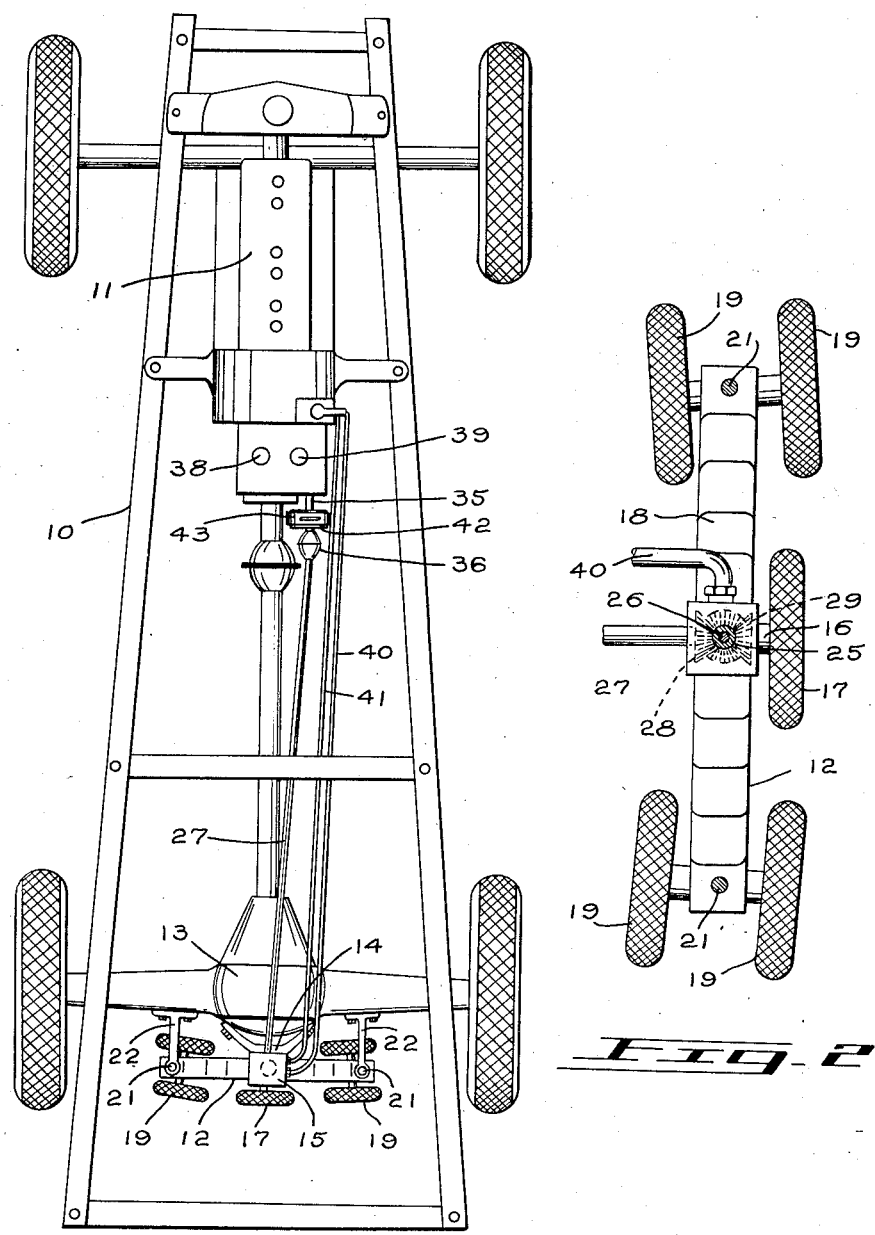
INVENTOR
Hubert E. Dendoff
By Ralph Burch
Attorney July 2, 1935. H. E. DENDOFF 2,006,886
PARKING DEVICE
Filed Dec. 28, 1933 2 Sheets-Sheet 2
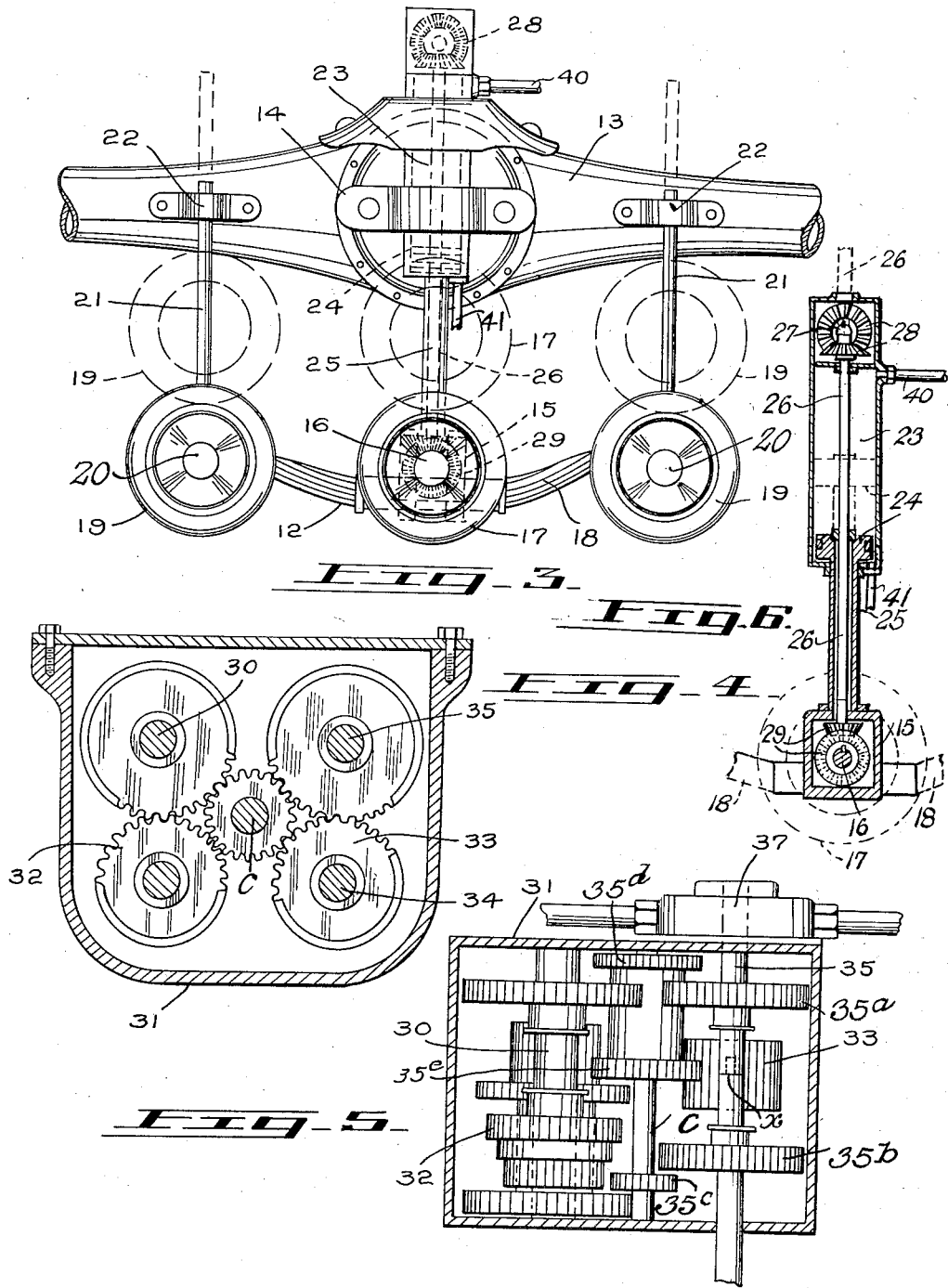
INVENTOR
Hubert E. Dendoff
By Ralph Burch
Attorney Patented July 2, 1935

2,006,886

UNITED STATES PATENT OFFICE 2,006,886

PARKING DEVICE

Hubert E. Dendoff, Vancouver, British Columbia, Canada

Application December 28, 1933, Serial No. 704,351
In Canada November 10, 1933

3 Claims. (Cl. 180—1)

This invention relates to improvements in an automobile parking device. Its primary object being to provide means whereby the rear end of an automobile may be lifted and moved sideways to aid in parking the same.

A further object of the invention is to provide hydraulic lifting means for the rear of an automobile said means being controlled by an additional gear and gear shift lever conveniently positioned within reach of the drive and a drive wheel mounted thereon substantially at right angles to the center line of the automobile and driving mechanism for the same controlled by aforesaid additional gear and gear shift lever.

With these and other objects in view that may appear while the description proceeds the invention consists in the novel construction and arrangement of parts as hereinafter more specifically set forth, claimed and shown in the accompanying drawings forming part of this application and in which:

Fig. 1 is a plan view of an automobile chassis showing my invention as constructed therewith.

Fig. 2 is an enlarged plan view of lateral movement truck.

Fig. 3 is a partial rear end elevation of the lifting gear and lateral movement truck.

Fig. 4 is a sectional view of the improved gear box used in conjunction with my invention.

Fig. 5 is a plan view of the same showing the hydraulic rotary pump attached thereto.

Fig. 6 is a vertical section of the hydraulic lifting means.

Referring more in detail to the drawings in which similar reference characters designate corresponding parts throughout the several views it will be seen the invention comprises an automobile chassis 10 having an engine 11 mounted thereon in the usual manner. A laterally disposed truck 12 is provided and is indirectly supported on the differential housing 13 by a bracket 14 substantially at right angles to the center line of the car. Said truck comprises a bearing box 15 in which is rotatably mounted a shaft 16 supporting a traction wheel 17. A lateral spring frame 18 supporting the outer truck wheels 19 is secured to the said bearing box. The said wheels 19 are freely mounted on shafts 20 which are secured in the said frame 18 slightly on an angle to correspond to the arc in which the rear end of the automobile would move when the front end remains stationary. Guide rods 21 are secured to the outer ends of the said frame and slidably engage guide brackets 22 secured on the housing.

A hydraulic cylinder 23 is secured vertically in the bracket 14 on the differential housing and a piston 24 reciprocally mounted therein. The piston rod 25 extends downward through the packing glands to the top of the bearing box 15 to which it is permanently secured. The said piston rod 25 is hollow and a vertical drive shaft 26 is fitted rotatably and slidably therein. Said shaft being connected to a main drive shaft 27 by means of a pair of bevel gears 28 and to the shaft 16 by a similar pair of bevel gears 29.

The drive is derived from the main drive shaft 30 of the engine 11 by means of a special transmission gearing enclosed in the gear box 31. Said gear mechanism comprises in addition to the usual change speed gear 32, a pair of shafts 34 and 35. The shaft 35 is fluted and split in the center at "X" with a male and female connection to permit separate movements of both sections of the shaft. The center shaft C is provided with gears 35c, 35d and 35e. The intermediate gear 35e is in mesh with the gear 33 on shaft 34. Two gears 35a and 35b are slidably mounted on the two separate sections of shaft 35 and in non-rotatable relation thereto, said gears being moved into or out of mesh with gears 33, 35c or 35d by means of the shift lever 39. One end of the drive shaft 35 connects to the aforesaid drive shaft 27 through a universal joint 36. The other end of the said drive shaft 35 is connected to a rotary hydraulic pump 37 mounted on the gear box 31. The transmission gears are controlled by the usual selective lever 38, and a similar selective lever 39 is provided on the gear box by which the additional gears driving the lateral truck traction wheel and the hydraulic pump are operated.

From the hydraulic pump are two pipes 40 and 41 connecting with the hydraulic cylinder 23 one at the upper end and one at the lower end by which the fluid contained therein is moved one way or the other to actuate the piston and raise or lower the truck.

In order to prevent the rear of the car from swinging sideways when parked on a slope a brake device is provided for the traction mechanism. This comprises a brake drum 42 positioned on the drive shaft 35 and a brake band 43 mounted thereon. Said brake band may be connected to the usual emergency brake lever or may be provided with a separate lever as found most convenient of manufacture.

In operation, the gear lever 39 will be manipulated to shift the gear 35a into mesh with gear 35d which operates the pump in one direction and to reverse the direction of the pump, gear 35a is shifted to mesh with gear 33. This operation controls the raising and lowering of the truck 12. To operate the traction wheel 17, gear 35b is shifted into mesh with gear 35c to move the wheel in one direction and to reverse the movement of direction gear 35b is shifted into mesh with gear 33.

It is believed that the construction and advantages of the structure shown may be apparent from the foregoing paragraphs taken in connection with the accompanying drawings without further detailed description.

While the preferred embodiment of the invention has been disclosed it is understood that minor changes in the details of construction, combination and arrangement of co-operating parts may be resorted to within the scope of what is claimed without departing from the spirit of the invention.

I claim:

1. In an automobile parking device of the type set forth, a chassis, an engine mounted thereon, a hydraulic cylinder mounted on the differential housing of the said chassis, a piston reciprocally mounted therein, a hollow piston rod connected to said piston and extending downward therefrom a laterally disposed truck connected to the lower end of said piston rod, guide rods extending vertically from said truck slidably engaging guide brackets therefor, means actuating said piston from said engine a drive shaft rotatably and slidably mounted in said hollow piston rod, bevel gears mounted on upper and lower ends of same, a corresponding gear mounted on a drive shaft engaging said upper gear, a corresponding gear mounted on a shaft support in a bearing box on said truck and a traction wheel likewise mounted on said shaft, said drive shaft actuated through a gear train from said engine forming driving means for said traction wheel.

2. In an automobile parking device of the type set forth, a chassis, an engine mounted thereon, a hydraulic cylinder mounted on the differential housing of the said chassis, a piston reciprocally mounted therein, a hollow piston rod connected to said piston and extending downward therefrom, a laterally disposed truck connected to the lower end of said piston rod, guide rods extending vertically from said truck slidably engaging guide brackets therefor, means actuating said piston from said engine, a drive shaft rotatably and slidably mounted in said hollow piston rod, bevel gears mounted on upper and lower ends of same, a corresponding gear mounted on a drive shaft engaging said upper gear, a corresponding gear mounted on a shaft supported in a bearing box on said truck and a traction wheel likewise mounted on said shaft, a variable speed gear mechanism enclosed in a gear box, an additional gear mechanism enclosed in said box detachably engaging aforesaid gear mechanism, means selectively engaging or disengaging same, said additional gear mechanism comprising one speed forward or reverse drive and selectively connected to aforesaid drive shaft.

3. In an automobile parking device of the type set forth, a chassis, an engine mounted thereon, a hydraulic cylinder mounted on the differential housing of the said chassis, a piston reciprocally mounted therein, a hollow piston rod connected to said piston and extending downward therefrom, a laterally disposed truck connected to the lower end of said piston rod, guide rods extending vertically from said truck slidably engaging guide brackets therefor, means actuating said piston from said engine, a drive shaft rotatably and slidably mounted in said hollow piston rod, bevel gears mounted on upper and lower ends of same, a corresponding gear mounted on a drive shaft engaging said upper gear, a corresponding gear mounted on a shaft supported in bearing box on said truck and a traction wheel likewise mounted on said shaft, a variable speed gear mechanism enclosed in a gear box, an additional gear mechanism enclosed in said box detachably engaging aforesaid gear mechanism, means selectively engaging or disengaging same, said additional gear mechanism comprising one speed forward or reverse drive and selectively connected to aforesaid drive shaft, a hydraulic rotary pump mounted on said gear box, means selectively connecting same to said additional gear mechanism providing forward and reverse rotary motion thereto and means connecting same to said hydraulic cylinder, substantially as set forth.

HUBERT E. DENDOFF.